June 23, 1953  M. JACOBS ET AL  2,643,138
PIVOTED DETENT PIPE COUPLING
Filed March 3, 1949  2 Sheets-Sheet 1
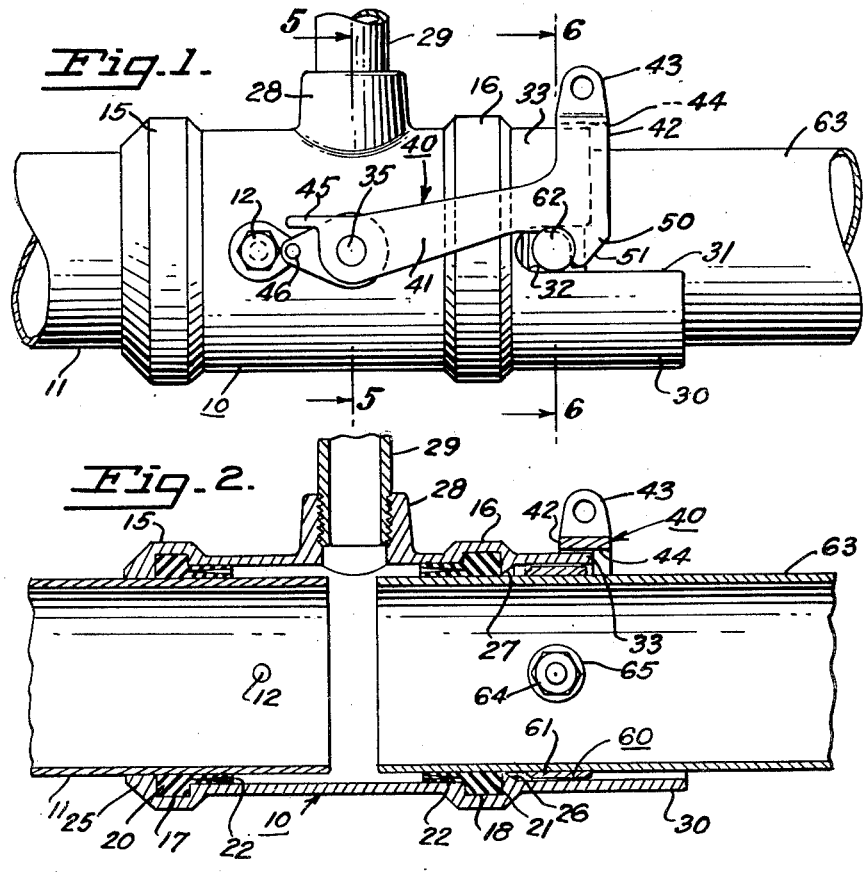
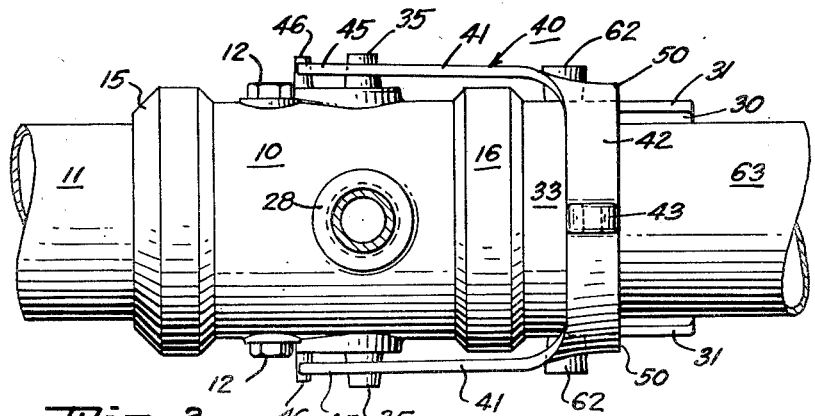
INVENTORS
MAYHELT JACOBS
PETER F. DRAGON
BY
*A. Dunham Owen*
ATTORNEY June 23, 1953  M. JACOBS ET AL  2,643,138
PIVOTED DETENT PIPE COUPLING Filed March 3, 1949  2 Sheets-Sheet 2

INVENTORS
MAYHELT JACOBS
PETER F. DRAGON
BY
ATTORNEY

Patented June 23, 1953

2,643,138

UNITED STATES PATENT OFFICE 2,643,138

PIVOTED DETENT PIPE COUPLING

Mayhelt Jacobs, San Francisco, and Peter F. Dragon, Oakland, Calif.; said Dragon assignor to Pacific Pipe Company, Oakland, Calif., a corporation of California Application March 3, 1949, Serial No. 79,426

1 Claim. (Cl. 285—172)

This invention relates to an improved fitting for pipes. More particularly, it relates to an improved quick-acting coupling for joining two sections of pipe together.

It is believed that the present invention will find particular use with portable irrigation pipe because it solves the problem of quick coupling and uncoupling of pipe sections. Thus a line of pipe can be quickly disassembled, and the sections moved to another location and reassembled into a new line of pipe. The coupling will hold tightly without leaks or slippages up to considerable pressures, so that there is no loss of efficiency while gaining the advantage of speed in assembly and disassembly. Moreover it solves the problem of providing a quick-action coupling which will not accidentally become uncoupled.

The objects of the invention are to provide a pipe coupling which can be quickly locked together and as quickly unlocked; which is leaktight and which gets tighter as the water pressure increases; to provide a coupling in which the gaskets are protected from displacement due to the fluid pressure or to the joining together and the unjoining of the coupling; to provide a coupling member which can stand considerable pressure without coming apart; to provide a coupling which lengthens the life of the pipe because it can be removed and replaced on a fresh section of pipe when the male end becomes bent and misshapen; and to provide a coupling member which enables one to join together two sections of pipe without being at or touching the coupling member.

Other objects and advantages of the invention will be found from the following description of a preferred embodiment presented in accordance with United States Revised Statutes, Section 4888. Changes may be made in the precise structure without affecting the invention and, therefore, it is to be understood that the scope of the invention is defined by the appended claim and that this is not to be narrowly limited to the particular embodiment described.

In the drawings:

Fig. 1 is a view in side elevation of a coupling-fitting embodying the principles of this invention shown attached at the ends of two sections of pipe;

Fig. 2 is a view similar to Fig. 1 with the parts shown in section;

Fig. 3 is a top plan view of the coupling shown in Fig. 1;

Figure 4:
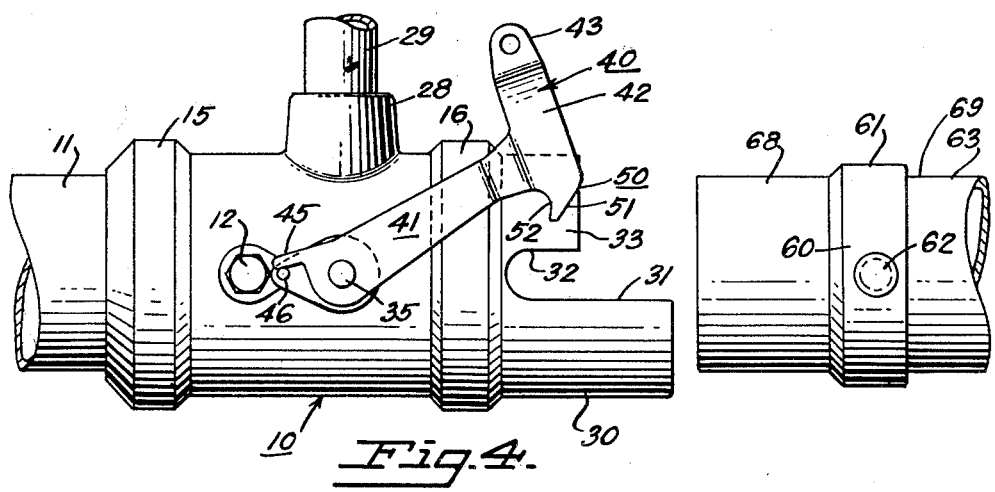
Fig. 4 is a view of the coupling shown in Fig. 1 with the members uncoupled.
Figures 5, 6:
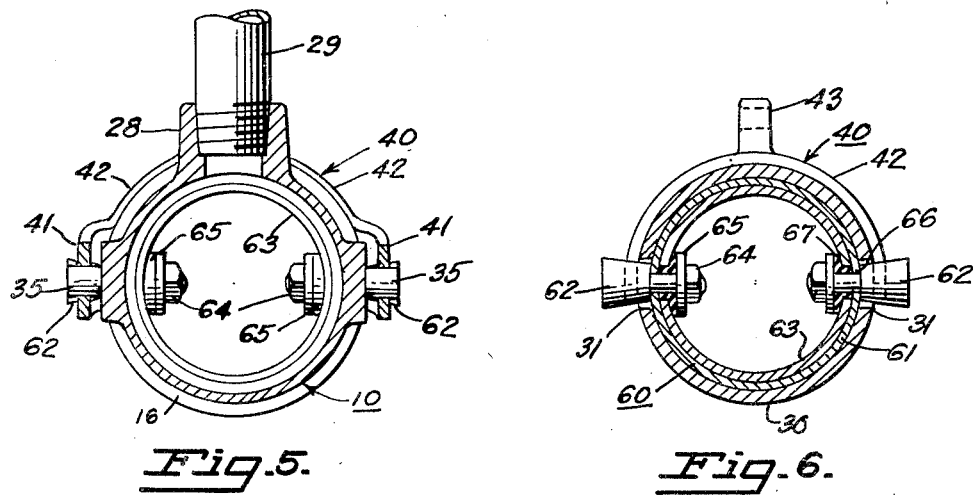
Fig. 5 is a section taken along the line 5—5 in Fig. 1.
Fig. 6 is a section taken along the line 6—6 in Fig. 1.

In general the invention comprises a pair of fittings one of which is attached to each end of a pipe section. One of the fittings is a male coupling member whose studs fit into the slots in the female coupling member. The latter includes a guide rim and slot for positioning the studs and a pivoted latch which is temporarily displaced by studs on the male member during the coupling operation and subsequently falls back down behind the studs and locks the members together. Preferably the pipe, the fitting and all of the other parts are made of cast or machined aluminum because its light weight enhances the portability of the pipe. However, they may be made from other materials without affecting the operation or structure of the coupling.

The pipe section shown is a type suitable for use in a sprinkler irrigation system. Usually a main stationary line along the edge of a field is equipped with a number or hydrant outlets and valves, to any one or more of which may be attached portable lateral lines having a series of sprinklers. The portable pipe may be made in sections about 20 feet long and adapted to be joined together by the coupling herein described. According to the preference of the farmer, the female coupling member may or may not be fitted with a sprinkler outlet. The female member 10 may be made as a straight sleeve, as shown, or it may be made as an elbow, T, Y, or adapter. The end of the last pipe in the line may be left open, but where pressure lines branch off along the pipe it is closed on the end by a plug. Pressures up to 500 lbs. per square inch are sometimes put on the pipe line and the couplings have to withstand this pressure without bursting or leaking. The coupling shown is constructed to withstand these pressures.

The female coupling member 10 comprises a sleeve removably secured adjacent one end of a pipe section 11 by bolts 12. Preferably the bolts 12 are threaded tightly into holes in the pipe 11 so that no gasket is needed to prevent leakage, but gaskets may be used if desired.

Adjacent the ends of the sleeve 10 are annular bosses 15 and 16. Each boss is recessed to provide an annular inside groove 17, 18, in which fits an annular gasket 20, 21 (see Fig. 2). Preferably each ring gasket 20, 21 is made of rubber or synthetic rubber having split, V-shaped flanges forming lips 22 which face in toward the center of the sleeve 10. Normally these lips engage the outside diameter of the pipes and the inside diameter of the sleeve 10. When water flows through the sleeve, the fluid pressure bears against the lips and seals them tightly against the pipes and the sleeve. The greater the water pressure, the tighter the sealing pressure is on the lips 22.

A rib 25 and 26, around the outer side of each groove 17, 18, respectively, protects the gaskets 20 and 21 from injury incident to the insertion and removal of pipes in the coupling. Preferably the outer side of the rib 26 is tapered at 27 to help guide the male pipe into its central position through the gasket 21.

The sleeve 10 as shown in the drawings includes a riser outlet 28 in which a nipple 29 or sprinkler head may be threaded. When not in use a plug can be threaded into the opening. This outlet 28 is not necessary to the invention and many fittings are made without it. However, it is shown to illustrate how the water is conducted to sprinklers. The ends of the two pipe sections 11 are spaced apart so the water may pass between them into the sprinkler pipe 29.

The outer end of the sleeve 10 (right hand end in Figs. 1 to 4) beyond the boss 16 comprises the female portion of the severable coupling. Preferably the upper portion is cut away leaving the lower portion of the sleeve 10 to form a lip 30 which is adapted to receive and to guide the incoming male pipe. The upper faces 31 of the lip 30 guide the studs 62 on the male member into the slots 32 formed between the lip 30 and the short sleeve portion 33.

A pair of pivot bearings 35 spaced axially from and in line with the slots 33 support a latch member 40. The latch 40 comprises two arms 41 joined by a semi-circular strip portion 42 and normally rests on top of the sleeve projection 33. It may have a small handle 43 at the top or it may be lifted by inserting a finger beneath it and beyond the end of the projection 33 at 44.

Two stop members 45 project from the ends of the arms 41 (adjacent the bearings 35) and limit the upward swing of the latch 40 by engaging two cooperating stop members 46 projecting from the sleeve 10 just back of and axially in line with the bearings 35. These stops 45, 46 prevent the latch 40 from being moved too far out of position and also prevent damage to the latch during transit.

Adjacent the juncture of the arms 41 and the half-circle strip 42 are depending detents 50. The forward edge 51 of each detent is tapered so that when the male end of the pipe is inserted, the studs 62 push against them and the latch 40 is lifted enough to permit the studs to slide behind the detents 50. The inner surface 52 of each detent 50 is curved to prevent movement of the studs 62, except when the latch 40 and the detents 50 are lifted.

The male coupling member 60 (see Fig. 4) comprises a ring 61 having holes 66 to receive two threaded studs 62. The ring is secured adjacent the end of the succeeding pipe section 63 by means of the studs which extend through holes 67 in the pipe and are secured by nuts 64. Gaskets 65 may be used to prevent leakage out through the holes 67 in the pipe.

Preferably the studs 62 are flared or tapered outwardly from the pipe, so that in the direction of the pull on the coupling the angle is less than a right angle with respect to the axis of the pipe. The purpose of this is to prevent the studs from spreading the detents 50 and releasing the coupling when the water pressure builds up and tends to force the pipes apart. By having the studs tapered the cam action on the latch portions 52 puts an inward rather than an outward thrust on them so they won't stretch apart.

When two pipes having the above male and female members are to be joined together, all that need be done is to lay the end of the pipe having the male coupling member 60 on the lip 30 of the female member 10. Then the male pipe 63 is moved axially into the sleeve. The studs 62 slide along the upper faces 31 of the lip 30 and into the slots 32. As they slide, the studs 62 lift the latch 40 high enough to slide past the detents 50, and then the latch 40 falls and supports the detents 50 adjacent the studs 62. The rib 26 protects the gasket 21 as the pipe 63 is moved into place. When water flows through the sleeve 10 the fluid pressure tends to spread apart the lips 22 of the gaskets 20 and 21 and prevents any leakage. Water may flow up through the space between the pipes 11 and 63 into the nipple 29 and to any outlet connected to it.

To separate two connected pipes 11 and 63 the latch 40 is lifted, either by raising the handle 43 or by placing the finger under the collar 42 and holding it up until the studs 62 have moved beyond the detents 50.

It will be seen that the present invention enables rapid coupling and uncoupling of successive pipe sections and that when coupled, the joint is leak tight.

Around a farm or other place where this pipe is used it is not handled with too much care. It is moved from field to field and is dumped off trucks or carts at intervals prior to being coupled. Other farm implements bump against it and in time the end section 68 of the pipe 63 becomes misshapen. The pipe then becomes difficult or impossible to couple together in a good leak-tight fit and it is discarded. However, when pipe with couplings of the present invention have the end section 68 damaged, all the farmer has to do is to cut off the end somewhere in the vicinity of the number 69 (Fig. 4), and drill two new holes 67 in the pipe. Then he removes the nuts 64 and the studs 62 from the cut off piece. The ring 61 is removed from the cutoff piece and is put on the freshly cut end of the pipe 63 with the holes 67 aligned with the holes 66 in the ring. The studs 62 are replaced and the nuts 64 are tightened. The male coupling end is as good as new and the only loss is a few inches of the pipe.

The same thing is true with regard to the female coupling member 10, which can be relocated on a freshly cut end of the pipe 11 or on a new pipe by removing the screws 12, drilling new holes in the pipe to receive the screws and then replacing them.

Another advantage of the present invention is that the farmer can himself replace any pipe sections and apply the coupling parts to new pipe.

We claim:

A coupling for joining adjacent ends of a pair of pipe sections comprising a male coupling member in the form of a ring secured to one of said sections in spaced relation to an end thereof, a pair of studs projecting diametrically outwardly from said ring, said studs having frusto-conical walls tapering toward the center of said ring, a cylindrical female coupling member having one end thereof supported by the other pipe section adjacent an end thereof and with the major portion thereof projecting axially beyond such end, such female coupling member having a pair of diametrically disposed and axially extending stud receiving slots opening through the opposite end thereof, said female coupling member being provided with a generally semi-cylindrical extension projecting axially beyond the outer ends of the upper walls of said slots and the free edges of said extension being aligned with the lower walls of said slots to provide means for guiding said studs upon entry of the male coupling member into the projecting end of the female coupling member, said female coupling member being provided with a rib disposed inwardly of its free end defining a circumferential space between same and said free end for receiving said ring in the assembled position of the coupling members and said rib having an inwardly bevelled face for guiding the adjacent end of the first named pipe section into said female coupling member, a swingable latch member including a pair of arms disposed on opposite sides of said female coupling member and having corresponding ends thereof pivoted to the female coupling member on an axis extending diametrically thereof and parallel to the axes of said studs, stud engageable detents carried by the other ends of said arms normally overhanging the slots and having outer inwardly bevelled surfaces engageable by said studs upon assembly of the coupling members and operative to swing said arms about said pivotal connections thereof for passage of said studs into said slots, said detents further having inner arcuate surfaces engageable with said studs, a pair of diametrically disposed outwardly projecting stop members supported on said female coupling member, the pivoted ends of said arms being provided with extensions rearwardly of the pivotal connections thereof and providing stop members engageable with said first stop members upon swinging of said arms by said studs and for limiting the range of such swinging movement.

MAYHELT JACOBS.
PETER F. DRAGON.

References Cited in the file of this patent

UNITED STATES PATENTS

| Number | Name | Date |
|---|---|---|
| 406,964 | Stedman | July 16, 1889 |
| 996,079 | Greenlund | June 27, 1911 |
| 1,148,913 | McClellan | Aug. 3, 1915 |
| 1,178,348 | Robertson | Apr. 4, 1916 |
| 1,793,015 | Roos | Feb. 17, 1931 |
| 1,941,856 | Fraley | Jan. 2, 1934 |
| 2,182,797 | Dillon | Dec. 12, 1939 |
| 2,219,162 | Jacobs | Oct. 22, 1940 |
| 2,281,633 | Stitzer | May 5, 1942 |
| 2,449,735 | Wyss | Sept. 21, 1948 |
| 2,494,854 | Anderson | Jan. 17, 1950 |
| 2,494,855 | Anderson | Jan. 17, 1950 |